H. D. WILLIAMS.
MACHINERY FOR THE HYDRAULIC TRANSMISSION OF POWER.
APPLICATION FILED APR. 4, 1911.
1,047,600.
Patented Dec. 17, 1912.
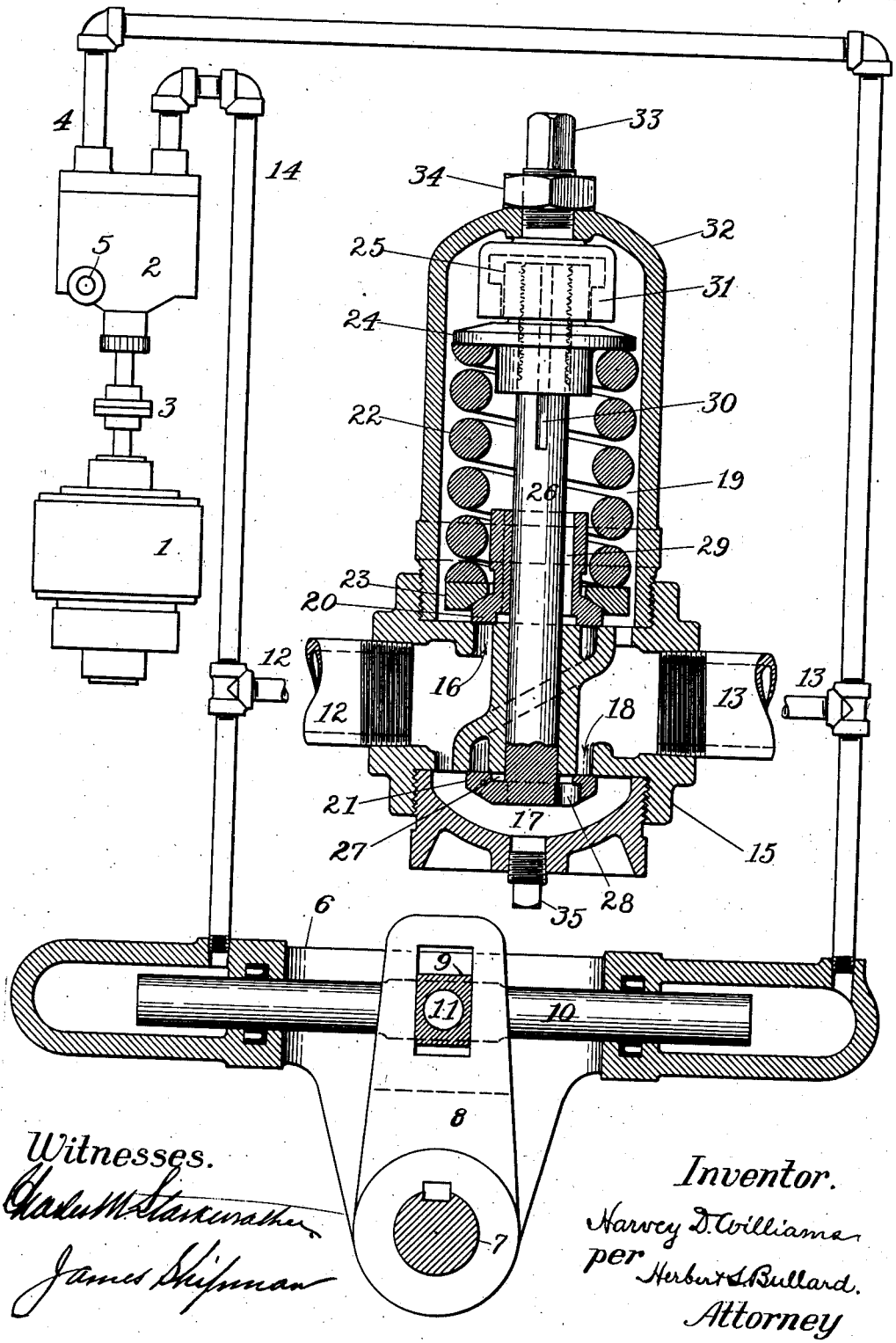
Witnesses.
Inventor.
Harvey D. Williams
per Herbert S. Bullard.
Attorney

UNITED STATES PATENT OFFICE.

HARVEY D. WILLIAMS, OF NEWPORT, RHODE ISLAND, ASSIGNOR TO THE WATERBURY TOOL COMPANY, OF WATERBURY, CONNECTICUT, A CORPORATION.

MACHINERY FOR THE HYDRAULIC TRANSMISSION OF POWER.

1,047,600. Specification of Letters Patent. Patented Dec. 17, 1912.

Application filed April 4, 1911. Serial No. 618,954.

*To all whom it may concern:*

Be it known that I, HARVEY D. WILLIAMS, a citizen of the United States, residing at Newport, in the county of Newport and State of Rhode Island, have invented Improvements in Machinery for the Hydraulic Transmission of Power.

My invention relates particularly to a combination of hydraulic machinery constituting a variable speed gear which I have disclosed in Patent No. 925148, granted June 15, 1909.

Briefly described this variable speed gear comprises a pump and a motor with fluid connections between them for the continuous circulation of a liquid. The pump is shaft driven at a constant number of revolutions, but the volumetric output of the pump can be varied at will by varying the stroke of the pump pistons. The same device which permits the output of the pump to be varied permits also of the reversal of the direction of circulation within the fluid connections between the pump and the motor. Thus the motor which is of any ordinary type of hydraulic motor may be readily reversed and the speed may be controlled with great nicety by appropriate manipulations of the stroke varying device in the pump.

It is characteristic of this type of variable speed gears that the working stresses in the machine may, under certain normal conditions of working, increase proportionally as the speed of the motor diminishes. Thus as the speed of the motor approaches zero the stresses will become greater than the materials can withstand unless resort is had to some safety appliance. Heretofore this safety appliance has taken the form of a relief valve which permits some of the liquid to escape from the circulatory system whenever the pressure of the liquid exceeds a certain maximum amount corresponding to the compression setting of the relief valve spring. The escape of liquid from the circulatory system leaves voids therein which quickly attain a volume comparable to the displacement of the pump pistons following which the chain of resistance between pump and motor is entirely broken and the pump continues its revolutions under practically no load.

This type of safety appliance has the merit of affording ample relief with a valve of diminutive size. Also the no-load condition which an excessive load quickly induces prevents the generation of a great quantity of heat within the working parts of the machine. On the other hand the operation of this safety device is very noisy and it puts the machine temporarily out of service.

The object of my invention is to provide a safety appliance which permits the circulating liquid to by-pass the overloaded motor, thus affording relief without putting the machine out of service. Such a by-pass safety appliance is particularly applicable and desirable when the quantity of the circulating liquid is great enough so that the heat generated within it during an overload will not cause a too quick rise of temperature.

Referring to the accompanying drawing, the constant speed electric (motor) or other engine 1 drives the pump 2 by the direct coupling 3 of the engine and pump shafts. The pump 2 circulates a liquid (lubricating oil) through the pipes 4 and 14, the speed of the circulation and the direction of the same being varied or reversed by turning the control shaft 5. The pipes 4 and 14 lead to the opposed cylinders of the hydraulic motor 6. The purpose of this particular motor is to impart a rocking motion to the shaft 7 through the medium of the arm 8, the sliding block 9, and the double ended plungers 10 with trunnion pins 11. This hydraulic motor, of a type quite different from the one disclosed in the patent above referred to, is used here for illustration because the positive stop to the movement in either direction of the plunger 10 is a condition which might well make frequent demands on a safety device, while the heat difficulty referred to above is mitigated by the comparatively large volume of liquid required to fill the opposed cylinders of the motor 6.

The major part of the by-pass from 12 to 13 is cut away in the drawing in order to show to a larger scale the details of the safety valve which is inserted in the by-pass and is its most essential part. The body of the safety valve 15 is provided with cored passages which allow free communication between the pipe 12, the annular port 16 and the space 17. Other cored passages allow free communication between the pipe 13, the annular port 18 and the space 19.

The annular ports 16 and 18 are closable respectively by the check valves 20 and 21 both of which valves are held against their seats by the force of the spring 22. The force of the spring is imparted to the valve 20 through the medium of the washer 23 which, by virtue of a spherical contact with the valve 20, insures the central application to the valve 20 of the force of the spring 22. The exactly equal and opposite force of the spring 22 is imparted to the valve 21 through the medium of the flanged collar 24, the nut 25 and the threaded stem 26 of the valve 21. Between the stem and the seating surface of the valve 21 there is turned a channel 27 to receive the liquid which discharges past the inner edge of the annular port 18. From the channel 27 this liquid passes to the space 17 through a plurality of holes 28. From another channel like 27 in the valve 20 the liquid passes to the space 19 through a plurality of grooves 29 which last however are not permitted to interfere with a nice sliding fit of the valve 20 on the stem 26. By thus providing for the free escape of liquid from the inner edges of the annular ports 16 and 18 the lift required of the valves for a given discharge opening is much less than it would be if the escape were confined to the outer edges of those ports. The flanged collar 24 is prevented from turning on the stem 26 by a key in 24 engaging the keyway 30 in 26. The tension of the spring 22 is adjusted by turning the nut 25 by means of the loosely fitting socket wrench 31. Since the space 19 is of necessity closed in by the spring case 32 the socket wrench, in order to be turnable from the outside, is provided with a square ended spindle 33 which pierces the spring case 32 the two being locked together on the outside by the nut 34. It is thus possible to adjust the tension on the safety valve spring while the machine is in operation and with the higher pressure at either end of the by-pass. The tapped hole which is shown stopped by plug 35 is for the connection of a pressure gage in case it is desired to know the pressure at which the safety valve will open.

In the operation of the machine the pump 2 normally induces a circulation through the pipes 4 and 14 withdrawing liquid from one cylinder of the motor 6 and forcing an equal volume of liquid into the opposed cylinder. Under these conditions there will be no circulation through the by-pass 12, 13. But in case of an unyielding resistance to the movement of the plunger 10 or in case of a great external force being applied to the same, causing an excessive pressure in either of the cylinders of the motor, the circulation automatically shifts from the motor to the by-pass by the opening of the safety valve in the latter. So soon however as the cause of the excessive pressure has been removed the safety valve closes and the circulation shifts back again from the by-pass to the motor.

I claim:

1. A hydraulic mechanism comprising a pump, a motor, fluid connections between the two whereby the pump can drive the motor in either direction, a by-pass paralleling the motor, a safety valve in the by-pass, the safety valve comprising two relief valves for relieving pressure at either end of the by-pass, one spring for loading both relief valves whereby the load on each relief valve is the reaction from the load on the other valve, a coaxial arrangement of the spring and the relief valves, a washer interposed between the spring and one of the relief valves, a spherical joint between the washer and the contacting valve, means comprising a screw thread and a nut for adjusting the load on the spring, the said adjusting means together with the spring and the valves inclosed within a fluid tight casing, a wrench piercing the casing by a turning joint and adapted for turning the nut on the inside of the casing by a stem projecting outside thereof, substantially as described.

2. A safety valve comprising two check valves arranged in parallel between two pipe connections, each check valve closable by and against a pressure which tends to open the other valve, each valve held against its seat by the force of a spring the reaction of which is the load on the other valve, each valve contacting with its seat along an inner and an outer edge, the area of the port opening being confined to the annular area between the said edges, substantially as described.

In witness whereof I have hereunto set my hand in the presence of two subscribing witnesses.

HARVEY D. WILLIAMS.

Witnesses:
MARTHA BURDICK,
GEORGE J. SCHOENEMAN.